United States Patent
Carter

[15] 3,707,673
[45] Dec. 26, 1972

[54] CORONA DISCHARGE DETECTING APPARATUS INCLUDING GATABLE AMPLIFIERS CONTROLLED BY FLIP-FLOP MEANS

[72] Inventor: William J. Carter, Muncie, Ind.
[73] Assignee: Westinghouse Electric Corporation, Pittsburgh, Pa.
[22] Filed: March 29, 1971
[21] Appl. No.: 128,716

[52] U.S. Cl. ................. 324/52, 324/54, 324/140
[51] Int. Cl. ..................... G01r 31/08, G01r 31/12
[58] Field of Search ............. 324/51, 52, 54, 72, 140; 328/145

[56] References Cited

UNITED STATES PATENTS

| | | | |
|---|---|---|---|
| 3,255,417 | 6/1966 | Gottlieb | 328/145 |
| 3,505,597 | 4/1970 | Cronin et al. | 324/72 |
| 3,370,227 | 2/1968 | Bader et al. | 324/54 |
| 3,555,413 | 1/1971 | Matsuba | 324/54 |
| 3,612,992 | 10/1971 | Cronin | 324/72 X |
| 2,769,098 | 10/1956 | Dunham | 324/140 R |

FOREIGN PATENTS OR APPLICATIONS 828,327  2/1960  Great Britain ................. 324/54

*Primary Examiner*—Gerard R. Strecker
*Attorney*—A. T. Stratton, F. E. Browder and Donald R. Lackey

[57] ABSTRACT

Apparatus for accurately detecting corona discharges occurring within the casing of electrical inductive apparatus, such as transformers and electrical reactors. Mechanical disturbances within the apparatus, initiated by corona discharges, are detected by two spaced mechanical to electrical transducers. The signal from the two transducers are amplified, converted to unidirectional signals of like polarity, and the two signals are subtracted in a difference amplifier to cancel noise common to both signals while amplifying corona responsive portions of the signals.

5 Claims, 1 Drawing Figure

PATENTED DEC 26 1972
3,707,673
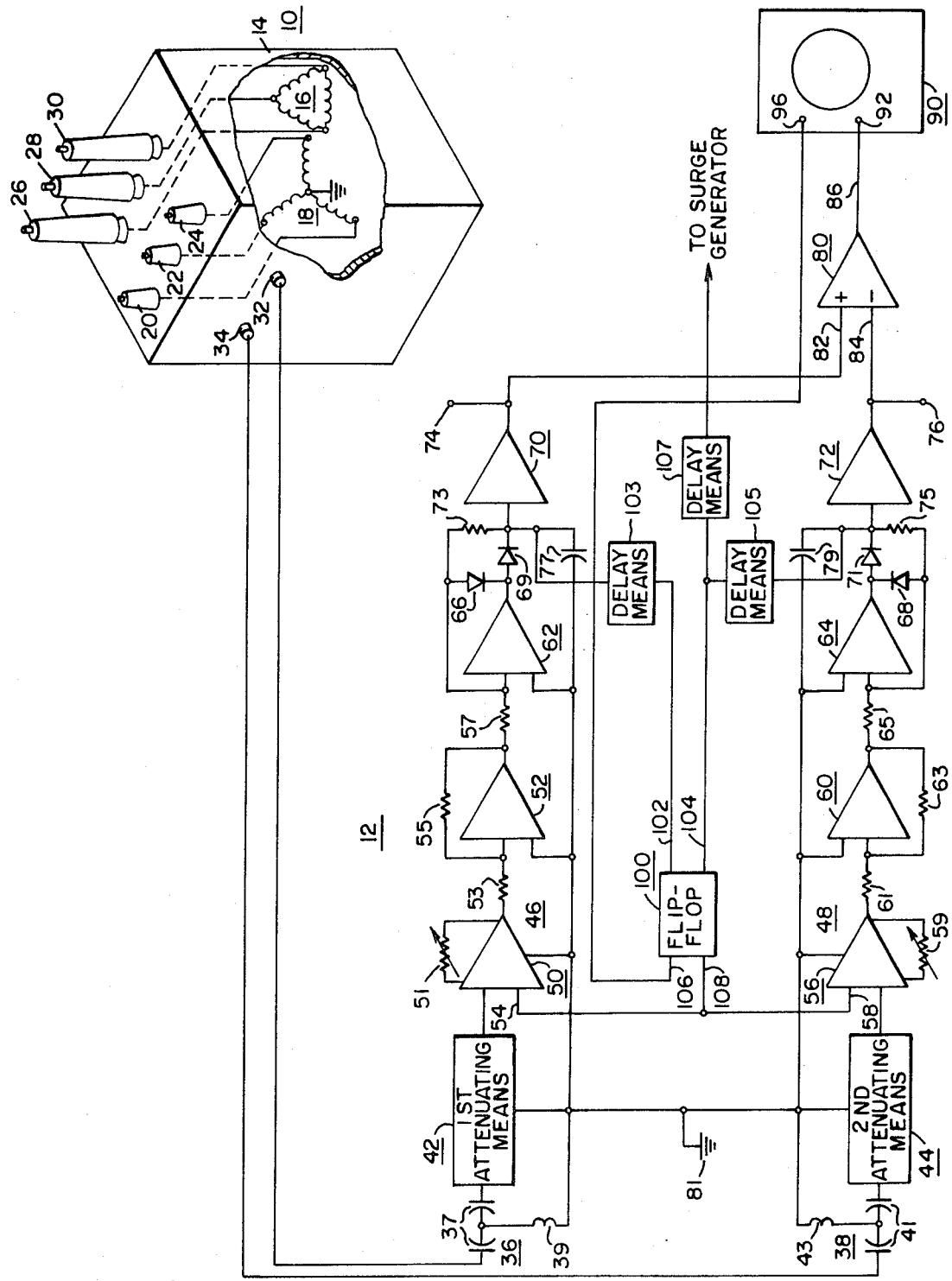
WITNESSES
Bernard R. Gieguay
Leon M. Garmon
INVENTOR
William J. Carter
BY
Donald R. Lackey
ATTORNEY

CORONA DISCHARGE DETECTING APPARATUS INCLUDING GATABLE AMPLIFIERS CONTROLLED BY FLIP-FLOP MEANS

BACKGROUND OF THE INVENTION

1. Field of the Invention

The invention relates in general to encased electrical apparatus, and more specifically to apparatus for more accurately detecting corona discharges occurring within such apparatus.

2. Description of the Prior Art

Sources of partial discharges or corona within the casing of electrical power apparatus, such as liquid filled power transformers and electrical reactors, are usually difficult to locate, as the small energy content of most sources leaves no observable evidence on the surrounding insulating structure after the impulse and low frequency tests applied to such apparatus prior to shipment. The energy content of partial discharges, however, while low, may cause a progressive deterioration of the surrounding insulation due to heat and chemical changes, which may lead to eventual failure of the apparatus, and it is therefore important to detect, locate and eliminate any sources of corona during test of the apparatus by the manufacturer.

Because of the difficulty in detecting and locating corona sources, many different arrangements and methods have been proposed, with the usual methods falling into one of two classes which may be broadly termed the electrical methods and the sonic methods. For example, U.S. Pat. No. 3,505,597, which is assigned to the same assignee as the present application, discloses a sonic arrangement which detects sonic disturbances within electrical inductive apparatus responsive to corona discharges, and locates the source of the disturbance by triangulation. My co-pending application, Ser. No. 33,434, filed Apr. 30, 1970, which is also assigned to the same assignee as the present application, discloses apparatus and methods which detect the corona discharge at the terminals of the windings, and thus may be termed an electrical method. Both approaches are useful, as one may be more successful in detecting and locating a certain type or location of corona source than the other. For example, if the corona source is not in the electrical winding being monitored, the electrical tests are not effective. Since the energy content of a corona discharge is small, sensitivity of the detecting apparatus is a problem with both general approaches, but it is more of a problem with the sonic methods. This is especially true on detecting corona discharges which are the result of impulse testing, as the impulse voltage produces noise which extends into the range of the corona induced vibrations, and thus cannot be filtered out by high pass or band pass filters. The sonic methods of detecting and locating corona would be more useful on impulse testing if they were more sensitive, as the relatively low velocity of sound waves through liquid transformer dielectric makes it attractive to locate corona sources by measuring the time for the sound wave to reach different points in the transformer, to convert this time to distance, and then to calculate the coordinates of the source. However, the accuracy of the sonic approach depends upon being able to detect the disturbances responsive to the corona discharges, and to separate the resulting signals from background noise.

Thus, it would be desirable to provide new and improved apparatus for sonically detecting corona, which is more sensitive than apparatus of the prior art in the detection of corona initiated sonic disturbances in electrical inductive apparatus during impulse testing, which signals may then be used to locate the source of the disturbance.

SUMMARY OF THE INVENTION

Briefly, the present invention is new and improved apparatus for detecting corona initiated sonic disturbances occurring within the casing of electrical inductive apparatus, which corona detecting apparatus eliminates background noise from the corona responsive signals, including the ultrasonic noise produced by an impulse test voltage during impulse testing of the electrical inductive apparatus. Two mechanical to electrical transducers are placed in vibration responsive association with the apparatus being tested. Each transducer picks up substantially the same background noise, but the corona initiated disturbance is detected by the two transducers at different times, due to spaced placement of the transducers. The signals produced by the two transducers are amplified, converted to unidirectional signals of like polarity, and subtracted. Since the two signals contain common background noise, the background noise is eliminated from the resulting signals, leaving only signals responsive to the corona discharges, which signals may be used with triangulation techniques for location of the corona source.

BRIEF DESCRIPTION OF THE DRAWING

The invention may be better understood, and further advantages and uses thereof more readily apparent, when considered in view of the following detailed description of exemplary embodiments, in which the single FIGURE, is a partially schematic and partially block diagram of corona detecting apparatus constructed according to the teachings of the invention.

DESCRIPTION OF PREFERRED EMBODIMENTS

Referring now to the single FIGURE, there is illustrated a transformer 10 and corona detecting apparatus 12, with the latter being constructed according to the teachings of the invention. Transformer 10 includes a tank or casing 14 containing high and low voltage windings 16 and 18, respectively, which are disposed in inductive relation with a magnetic core (not shown) and immersed in a suitable fluid insulating and cooling dielectric, such as oil or askarel. The low voltage winding 18 may include three phase windings connected in wye, with the neutral being grounded, and the other ends of the phase windings connected to low voltage bushings 20, 22 and 24. The high voltage winding 16 may include three phase windings connected in delta, with the terminals of the delta connection being connected to high voltage bushings 26, 28 and 30. Transformer 10 is typical of the high voltage electrical power apparatus which is given rigorous, low frequency and surge tests after manufacture, to assure that the apparatus will operate as intended over its expected service life.

Transformer 10 is monitored for corona discharges during the impulse and low frequency tests applied thereto, which corona test apparatus may include equipment for directly picking up electrical disturbances occurring in the windings themselves, such as at the bushing taps on the high voltage bushings, and means for detecting sonic impulses generated by the corona discharges. The present invention is directed to corona test apparatus of the sonic type, with the corona detecting apparatus 12 shown in the FIGURE making it possible to more accurately detect corona responsive signals, and the corona detecting apparatus is especially useful with impulse testing, as apparatus 12 is effective in eliminating noise due to the impulse voltage wave, which noise is in the same frequency range as the corona responsive vibrations.

More specifically, corona detecting apparatus 12 includes first and second mechanical to electrical transducers 32 and 34, respectively, such as sensitive microphones, which are placed in mechanical vibration responsive association with transformer 10, such as against the outer surface of the casing 14, as illustrated, or within the transformer casing 14. Corona discharges, whether occurring within the transformer windings, or outside the windings, such as at a corona shield applied to an edge of the magnetic core, dissipate energy which produces high frequency waves in the fluid of the transformer. The mechanical vibrations produced by these pressure waves are picked up by the first and second transducers 32 and 34, which in turn generate first and second electrical corona responsive signals.

The first and second corona responsive signals are first passed through high pass filters 36 and 38, respectively, which attenuate the normal low frequency background noise present in the transformer 10 and factory, and prevent the amplifiers of the detector system from being overdriven due to this background noise. Filters 36 and 38 each include capacitors and coils of the required ratings, such as capacitors 37 and coil 39 in filter 36, and capacitors 41 and coil 43 in filter 38. Filters 36 and 38, however, which should have cutoff frequency of about 5 KHz., do not remove high frequency background noise, such as the noise produced during impulse testing of transformer 10.

The first and second corona responsive signals may then be passed through first and second attenuating means 40 and 42, respectively, which may be resitive networks adjustable in steps, such as 20 db. steps. The first and second attenuating means 42 and 44 provide input gain control, allowing the detector system gain to be adjusted for optimum response.

The first and second corona responsive signals are then amplified in first and second amplifier means 46 and 48, respectively, with each amplifier means including one or more operational amplifiers, along with their associated feedback and output resistors. The first and second amplifier means 46 and 48 are each adjusted to provide a predetermined gain, such as about 80–100 db. For example, as illustrated, each amplifier means may include two operational amplifiers, with amplifier means 46 including a first operational amplifier 50 having feedback and output resistors 51 and 53, respectively, and a second operational amplifier 52 having feedback and output resistors 55 and 57, respectively. The first operational amplifier 50 includes means for gating the amplifier between "on" and "off" conditions, represented by input 54, which is useful for surge tests, as the amplifier may be gated to its on condition after the transformer is surged but prior to the sonic signal being received by the amplifier, and to its off condition after amplifying a corona responsive signal. Amplifier means 48 includes a first operational amplifier 56 having feedback and output resistors 59 and 61, respectively, gatable between its on and off conditions by input 58, and an operational amplifier 60 having feedback and output resistors 63 and 65, respectively.

The amplified first and second corona responsive signals are then converted to first and second unidirectional signals, respectively, of the same polarity, such as both positive, which signals are responsive to the peak magnitudes of the amplified first and second corona responsive signals. This eliminates the false signal or signals immediately preceding the larger true signal peaks, with these false signals being due to the sonic vibration entering the casing wall closest to the corona site, and traveling to the transducers through the casing wall more rapidly than the vibration travels through the liquid transformer dielectric. The first and second unidirectional signals may also be "stretched" slightly, to encompass noise reflections, which may be slightly out of phase as received at the two transducers, enabling these reflections to be cancelled along with directly occurring common noise picked up by the two transducers. The functions of peak detecting and signal stretching may be performed on the amplified first and second corona responsive signals by operational amplifier means 62 and 64, which function as linear rectifiers with resistors 73 and 75, and diodes 66 and 68 connected in their feedback loops, and diodes 69 and 71 in their outputs, respectively. Capacitors 77 and 79 are filter capacitors, connected from the outputs of amplifier means 62 and 64, respectively, to ground 81.

The first and second unidirectional signals responsive to the first and second corona responsive signals, respectively, may be amplified in amplifiers 70 and 72, respectively, which are preferably logarithmic amplifiers, in order to provide a wider range of output signals without gain changes. The output of amplifiers 70 and 72 should provide at least a 40 db. range, and these outputs may be used to drive peak detecting meters from terminals 74 and 76 when it is desired to measure the relative corona magnitudes of the first and second unidirectional signals.

The first and second unidirectional signals are amplified in a difference amplifier 80, such as an operational amplifier, with difference amplifier 80 having inverting and non-inverting inputs 82 and 84, respectively, and an output 86. The first and second unidirectional signals, which are of like polarity, i.e., positive, are applied to the inverting and non-inverting inputs 82 and 84, respectively. The output will be the difference between the first and second signals when a common signal occurs, and the corona signals will be displayed such that the non-inverting output channel will show positive pulses, while the other channel output will be seen as negative pulses. This allows both channels of information to be displayed, without electronic switching, on one channel of an oscilloscope 90, having Y-axis input terminal 92 connected to output 86 of difference amplifier 80, and an x-axis trigger terminal 96.

Difference amplifier 80 subtracts the two signals applied to its inputs 82 and 84, cancelling any portions of the first and second unidirectional signals which are common or in phase, and of like magnitude, such as both portions of the two signals containing surrounding background noise not removed by the high pass filters 36 and 38. Portions of the first and second unidirectional signals which are not in common, such as the portions of the signals due to the corona initiated sonic disturbance, will be amplified. It is assumed that the transducers 32 and 34 receive the corona initiated sonic disturbance signals at spaced times due to the different placements of the transducers on the casing wall, and this difference in the arrival times of the two corona responsive signals provides unbalanced inputs to the differential amplifier 80, amplifying the two separate signals. If the transducers are fortuitously placed equidistant from the corona site, the difference amplifier 80 will be balanced. Therefore, when there is no output from the difference amplifier 80 during a test, the position of at least one of the transducers should be changed during the next test to determine whether or not there is corona present in the transformer, and eliminate the possibility of the first placement of the transducers providing a balanced input to the difference amplifier 80.

In addition to an oscilloscope 90, or instead of using the oscilloscope 90, the output of amplifier 80 may also be used with magnetic tape recorders, strip chart recorders, or digital recording devices, with the difference amplifier 80 providing two channels of inputs to such devices even though such devices have a single recording channel. The output of difference amplifier 80 may also be connected to metering apparatus, with the non-inverting input being metered by selecting only positive pulses, and the inverting input being metered by selecting only the negative output pulses.

In impulse testing, it would be desirable to be able to eliminate interference or noise signals occurring after the impulse wave is applied to the transformer 10. This may be accomplished by connecting flip-flop means 100, i.e., a bi-stable multivibrator, to provide gate pulses for the gatable operational amplifiers 50 and 56. Flip-flop means 100 has inputs 102 and 104, either of which will change the state of flip-flop means 100, with input 102 being connected to be responsive to the first unidirectional signal, via adjustable delay means 103, and input 104 being connected to be responsive to the second unidirectional signal, via adjustable delay means 105. Delay means 103 and 105 are set such that the later signal will be past the gatable amplifier before it is switched off by the earlier signal. Flip-flop means may also be triggered by the output of difference amplifier 80. Flip-flop means 100 has first and second outputs 106 and 108, respectively. The second output 108 is connected to provide a gating signal for the inputs 54 and 56 of the operational amplifiers 50 and 56, respectively, with output 108 providing a gating signal when the state of flip-flop means 100 is changed in response to a signal applied to one of its inputs. When amplifiers 50 and 56 are "on," a signal appearing at output 108 of flip-flop means 100 will gate operational amplifiers 50 and 56 to their "off" conditions, preventing any further signals picked up by the transducers 32 and 34 from appearing as outputs of the corona detecting means 12. Output terminal 106 of flip-flop means 100 may be connected to trigger terminal 96 of the oscilloscope 90, if desired, to automatically trigger the x-axis or horizontal sweep of oscilloscope 90 with the first arriving corona responsive signal. The difference in time between the first and second corona responsive signals, as displayed on oscilloscope 90, or other recording means, may be used in determining the location of the corona site, by any of several methods known in the art.

If desired, amplifiers 50 and 56 could initially be "off," and gated "on" by the flip-flop means 100, through adjustable delay means 107, when the transformer 10 is surged. The delay means 107 would be adjusted to turn on the amplifiers after electrical interference caused by the firing of the surge generator has ceased, and prior to some signals being received by the amplifiers. This would eliminate noise in the signals prior to the corona initiated signals being received by the amplifiers. The amplifiers could then be gated off, as described. Thus, the flip-flop means 100 would turn on the amplifiers 50 and 56 just prior to their receiving corona initiated sonic signals, and "off" again after they have amplified the corona initiated sonic signals.

In summary, there has been disclosed new and improved corona detecting apparatus which increases the sensitivity of sonic methods of corona detection. The new and improved corona detecting apparatus eliminates background noise in the same frequency range as the corona responsive signals, thus making the disclosed apparatus especially valuable for impulse tests, or corona measurements in power substations where interference problems may be similar to those encountered during impulse testing. The disclosed apparatus, in addition to amplifying and recording corona initiated sonic disturbances, while cancelling background noise, may be used with qualitative metering, to obtain a relative indication of discharge magnitudes.

I claim as my invention:

1. Apparatus for detecting corona discharge in electrical inductive apparatus having a casing containing electrical windings disposed in a fluid, comprising:

first and second mechanical to electrical transducers adapted to be disposed in vibration responsive association with the electrical inductive apparatus and provide first and second corona responsive signals, respectively, in response to a corona initiated sonic disturbance in the electrical apparatus, said first and second corona responsive signals each containing essentially the same common background noise, but different corona signals due to different locations of the first and second transducer means relative to the corona site, first and second amplifier means connected to said first and second transducer means, said first and second amplifier means being gatable between on and off conditions and providing first and second amplified corona responsive signals, flip-flop means for gating said first and second amplifier means to the on condition just prior to receiving corona initiated signals, first and second detector means connected to said first and second amplifier means, providing first and second unidirectional signals having a magnitude responsive to the first and second amplified corona responsive signals, a difference amplifier having output terminal means and first and second input terminals connected to said first and second detector means, respectively, said difference amplifier subtracting the first and second unidirectional signals and providing output signals at said output terminal means in which the noise common to both of said first and second unidirectional signals is eliminated, while the corona initiated portions of the first and second unidirectional signals are amplified.

2. The apparatus of claim 1 including first and second logarithmic amplifier means connected from the first and second detectors, respectively, and to the difference amplifier, to increase the range of the first and second unidirectional signals without gain change.

3. The apparatus of claim 1 wherein the flip-flop means gates the first and second amplifier means to their off conditions after they have amplified a corona responsive signal.

4. The apparatus of claim 3 wherein the flip-flop means triggers the oscilloscope when it gates the first and second amplifier means to their off conditions.

5. The apparatus of claim 1 wherein the first and second input terminals of the difference amplifier are inverting and non-inverting, respectively, and including an oscilloscope connected to the output terminal means of the difference amplifier, said oscilloscope displaying the signals applied to the non-inverting and inverting inputs as positive and negative signals, respectively, on a single channel of said oscilloscope.

* * * * *